United States Patent [19]

Fradenburgh

[11] 4,142,697

[45] Mar. 6, 1979

[54] MECHANISM FOR SYNCHRONOUSLY VARYING DIAMETER OF A PLURALITY OF ROTORS AND FOR LIMITING THE DIAMETERS THEREOF

[75] Inventor: Evan A. Fradenburgh, Fairfield, Conn.

[73] Assignee: United Technologies Corporation, Hartford, Conn.

[21] Appl. No.: 812,309

[22] Filed: Jul. 1, 1977

Related U.S. Application Data

[63] Continuation of Ser. No. 759,287, Sep. 12, 1968, abandoned.

[51] Int. Cl.² ............................................. F42B 27/28
[52] U.S. Cl. .................................... 244/7 R; 416/34; 416/87; 416/88
[58] Field of Search ...................... 244/7, 17.11, 54; 416/34, 87-89, 121

[56] References Cited

U.S. PATENT DOCUMENTS

| | | | |
|---|---|---|---|
| 2,437,789 | 3/1948 | Robins | 416/88 X |
| 2,702,168 | 2/1955 | Platt | 244/7 |
| 2,749,059 | 6/1956 | Meyers et al. | 244/7 |
| 2,979,288 | 4/1961 | Klein | 416/87 |
| 2,989,268 | 6/1961 | Andrews | 244/7 |
| 3,128,829 | 4/1964 | Young | 416/88 |
| 3,439,888 | 4/1969 | Dancik | 244/7 X |
| 3,483,696 | 12/1969 | Gilbert et al. | 244/7 X |

*Primary Examiner*—Verlin R. Pendegrass
*Attorney, Agent, or Firm*—Vernon F. Hauschild

[57] ABSTRACT

A plurality of variable diameter rotors with mechanism for varying the diameter of the rotors synchronously, and including mechanism to limit the diameter of the rotors.

24 Claims, 10 Drawing Figures

INVENTOR
EVAN A. FRADENBURGH
BY Vernon F. Hauschild
ATTORNEY

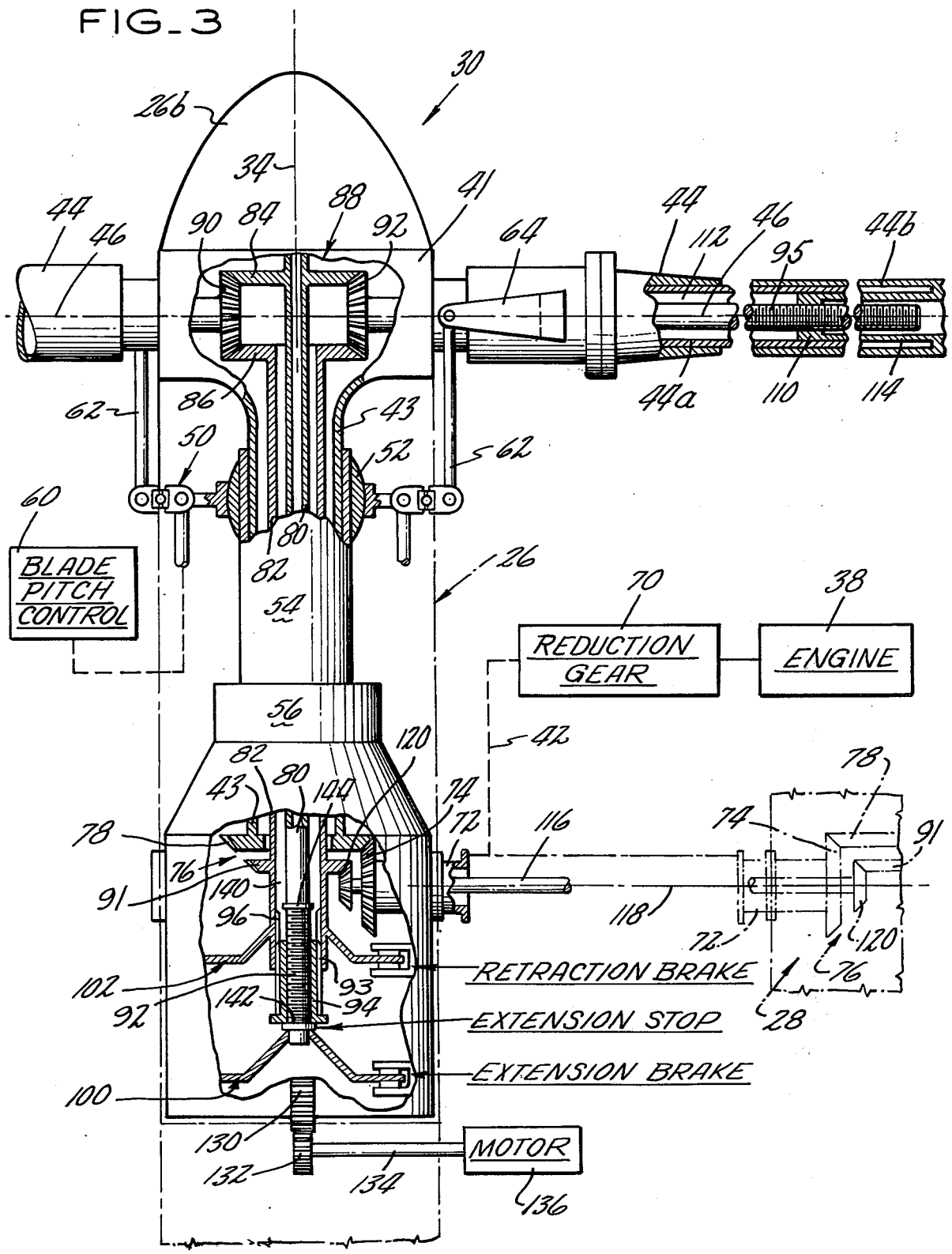

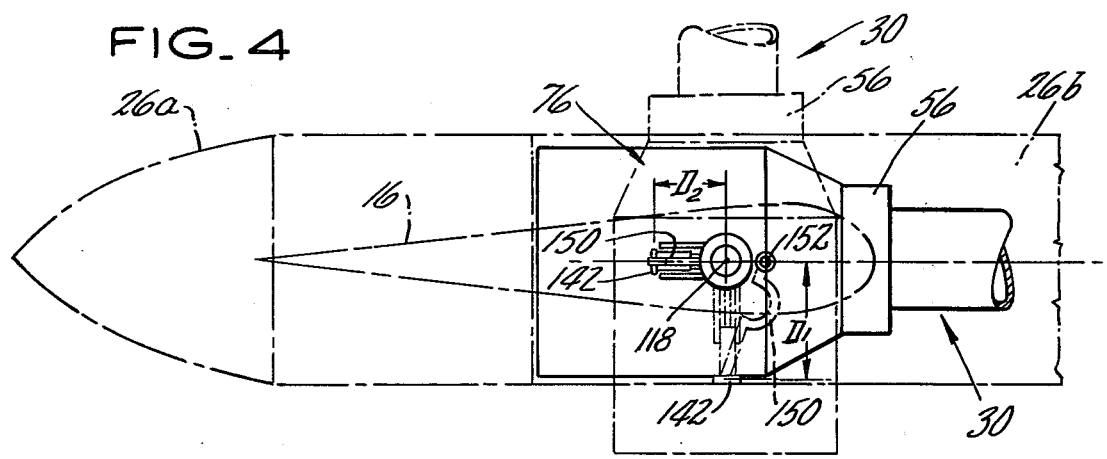
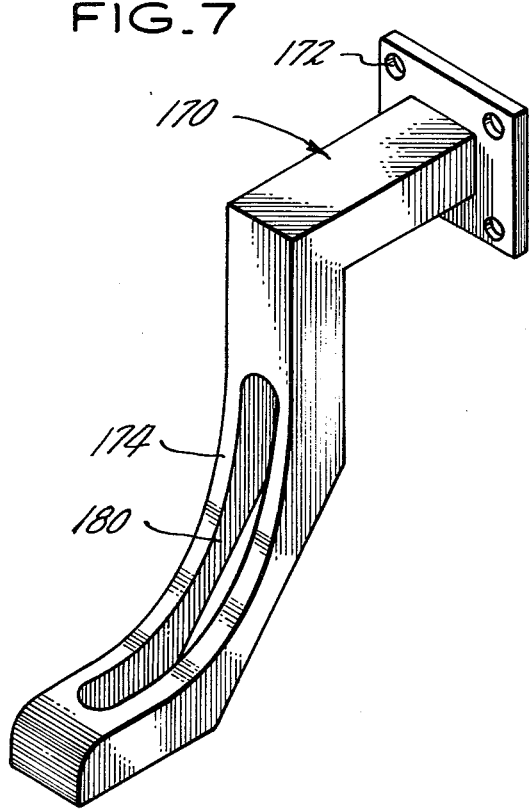
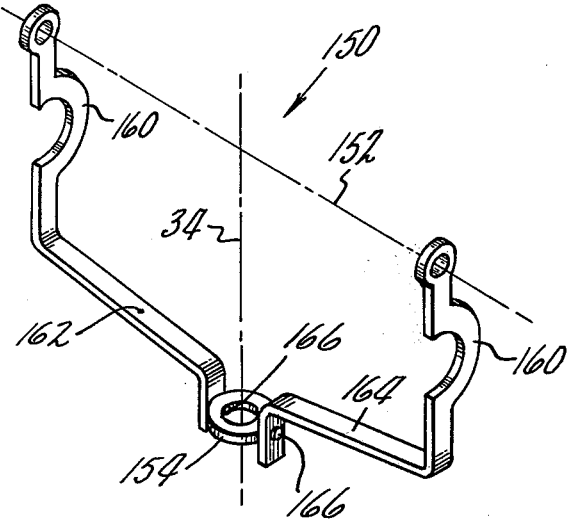
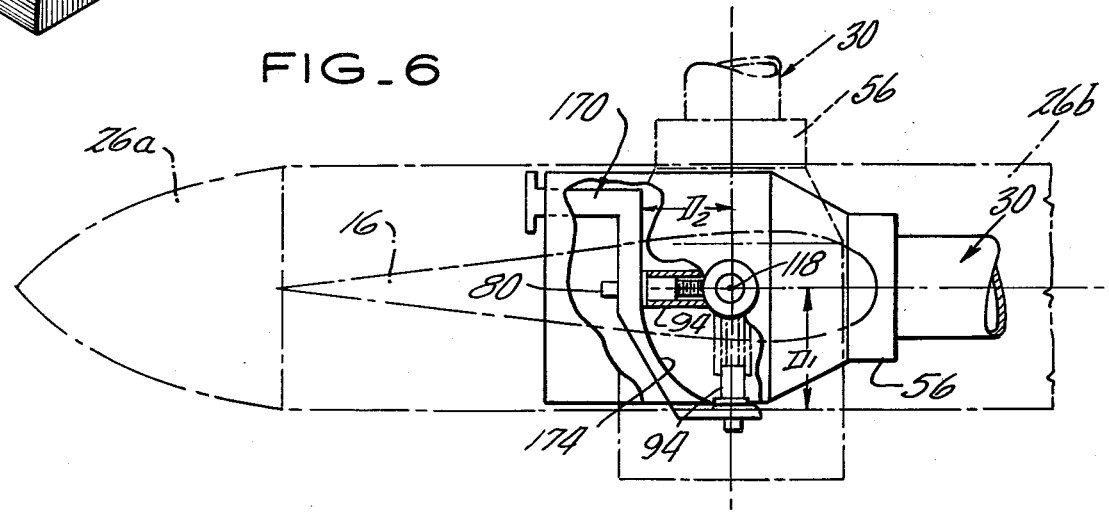

MECHANISM FOR SYNCHRONOUSLY VARYING DIAMETER OF A PLURALITY OF ROTORS AND FOR LIMITING THE DIAMETERS THEREOF

CROSS-REFERENCE TO RELATED APPLICATIONS

This is a continuation of application Ser. No. 759,287, filed Sept. 12, 1968, and now abandoned.

BACKGROUND OF THE INVENTION

1. Field of Invention

This invention relates to variable diameter rotors and more particularly to such rotors used in plurality and including mechanism to synchronously vary the diameters of the rotors. In addition, mechanism is provided to limit the diameter of the rotors and, further, the rotors are suspended from tiltable pods and the diameters of the rotors are synchronously varied in response to pod tilting.

2. Description of the Prior Art

While the prior art shows single rotors of variable diameter and plural rotors which are interconnected so as to be driven at the same speed, no prior art is known in which a plurality of rotors vary diameter synchronously and include diameter limit controls.

SUMMARY OF INVENTION

A primary object of the present invention is to provide mechanism to synchronously vary the diameter of a plurality of rotors.

In accordance with the present invention, mechanism is also provided to limit the diameter of the rotors so that rotor-to-rotor and rotor-to-fuselage interference is avoided.

In accordance with a further aspect of the present invention, the variable diameter rotors are supported in tiltable pods which are supported from aircraft wings and which are tiltable between vertical positions wherein the rotors serve as helicopter rotors so as to place the aircraft in the helicopter mode of operation and horizontal positions wherein the rotors serve as propellers to place the aircraft in the propeller mode of operation.

Generally, a relatively large rotor diameter is advantageous in the helicopter mode of operation in order to provide a low disk loading which results in efficient lower operation, low noise levels, and diminished downwash velocities. On the other hand, a relatively small diameter is advantageous in the propeller mode of operation in order to reduce tip speed and blade area for improved propulsive efficiency, and to minimize blade aero-elastic properties, and simplify ground handling. Accordingly, it is an important teaching of this invention to provide mechanism to vary the diameter of the rotors as the rotor supporting pods tilt between their helicopter mode and propeller mode positions.

It is still further an important aspect of this invention to teach mechanism wherein the rotor diameter limiting mechanism also serves as an indicator and means of control of rotor diameter.

BRIEF DESCRIPTION OF DRAWINGS

FIG. 3 is a view of the rotor and its drive and support system, partially broken away to illustrate the mechanism for synchronously varying the diameter of rotors and for limiting the diameters thereof.

FIG. 4 is similar in part to FIG. 3 and shows a mechanism for limiting the rotor diameters wherein the limit varies with pod tilting.

FIG. 5 is a perspective showing of a portion of the mechanism disclosed in FIG. 4.

FIG. 6 corresponds to FIG. 4 and illustrates a second diameter limiting mechanism wherein the limit varies with pod tilting.

FIG. 7 is an enlarged perspective showing of the cam mechanism utilized in the FIG. 6 construction.

DESCRIPTION OF THE PREFERRED EMBODIMENT

Figure 1:
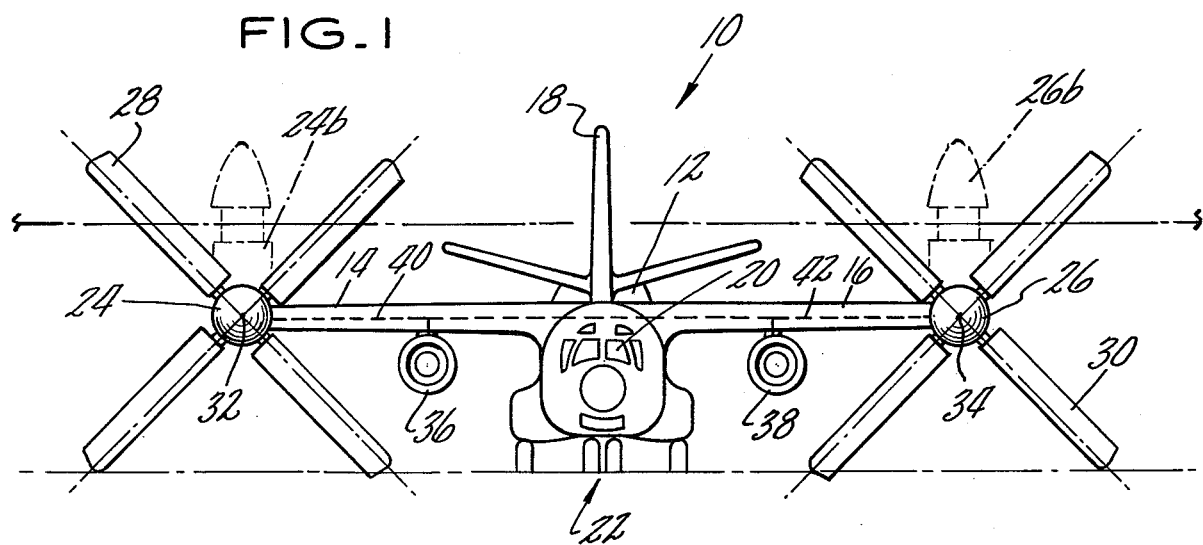
FIG. 1 is a front view of a modern aircraft which is a convertiplane and which shows variable diameter rotors or propellers positioned at the opposite ends of the aircraft wings to be in their helicopter mode position in phantom and in their propeller mode in solid lines.
Figure 2:
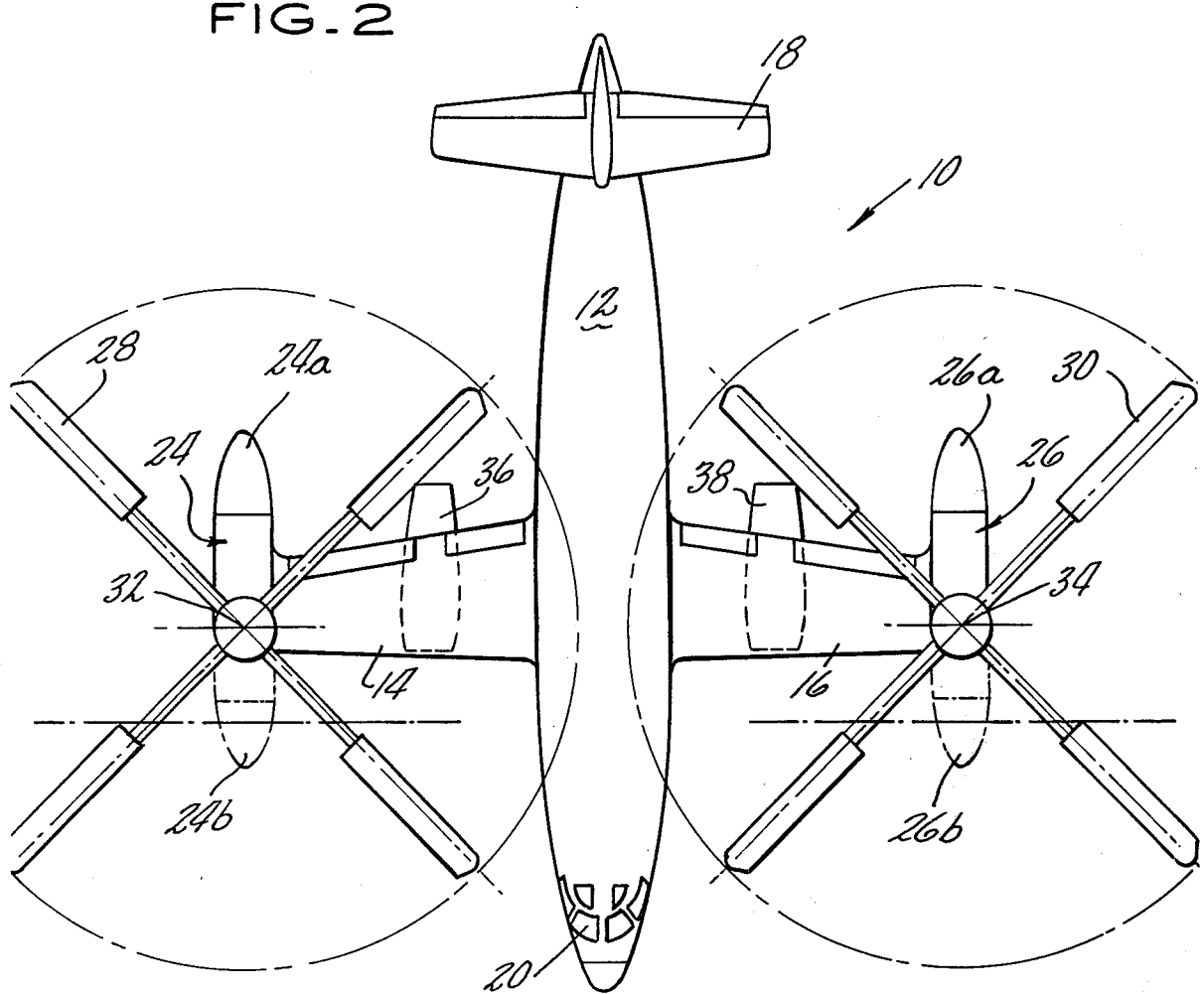
FIG. 2 is a top view corresponding to FIG. 1 with the rotors and their supporting pods shown in solid lines in helicopter mode and in phantom in the propeller mode.

Referring to FIGS. 1 and 2 we see modern aircraft 10, which is a convertiplane capable of operating in both the helicopter and propeller modes of operation. Aircraft 10 includes fuselage 12 from which wings 14 and 16 project laterally. Tail section 18 is positioned in conventional fashion at the after end of fuselage 12 and the pilot compartment 20 is positioned at the forward end of the fuselage. Landing gear 22, which may be of the tricycle type, supports the aircraft from the runway.

Pod members 24 and 26 are preferably positioned at or near the outer ends or tips of wings 14 and 16, respectively, and serve to support variable diameter rotors or propellers 28 and 30 for rotation about axes of rotation 32 and 34, respectively. Pods 24 and 26 may be split so that the after ends 24a and 26a are fixed with respect to wings 14 and 16 while the forward ends 24b and 26b are pivotable or tiltable between their vertical position, which they assume during the helicopter mode of operation, and their horizontal position, which they assume during the propeller mode of operation. Pods 24 and 26 and their support and tilting mechanism may be of the type more fully disclosed and described in U.S. Pat. No. 3,514,052, issued on May 26, 1970 on improvements in the name of John McKeown. It will be evident that pod members 24 and 26 could as well be of one-piece construction.

Engines 36 and 38, which are preferably of the gas turbine variety, are supported from the undersides of wings 14 and 16 and are connected through appropriate mechanical drive mechanism 40 and 42 to drive rotors 28 and 30. Drive mechanism 40 and 42 are interconnected.

Referring to FIGS. 3 we see a showing of rotor 30 in which pod 26 is partially broken away to show the mechanism which drives the rotor and causes the rotor blades to extend and retract to vary rotor diameter. It should be borne in mind that while one rotor only is being described, that both rotors are identical but allochiral. Rotor 30 consists of a central hub member 41 which is supported from rotor drive shaft 43 for rotation about axis 34. A plurality of blades 44 project from hub 41 and are connected thereto for rotation therewith about axis 34 and are also connected thereto through appropriate stack bearings (not shown) for rotation with respect thereto about pitch change or feathering axis 46 so that blades 44 may vary pitch both cyclically and collectively. Blades 44 may be of the type more fully disclosed in U.S. Pat. No. 2,163,482.

Swash plate assembly 50 is supported from spherical bearing 52 and stand pipe 54, which projects from main transmission and reduction gear housing 56. Blade pitch controls 60, which are conventional and may be of the type fully disclosed in U.S. Pat. No. 3,199,601 are utilized to cause the swash plate assembly 50 to translate along axis 34 and act through pivotal connecting rods 62 and pitchh change horns 64 to cause the pitch of blades 44 to vary collectively. Control 60 can also cause swash plate assembly 50 to tilt with respect to axis 34 and thereby cause the pitch of the blades to vary cyclically in conventional fashion.

Engine 38 drives through power chain 42, which may include reduction gear 70, to drive transmission input drive shaft 72. Transmission input drive shaft 72 is connected to bevel gear 74, which is a part of transmission assembly 76 and which coacts with beveled gear 78 to drive motor shaft drive 43 and thereby cause rotor 30 to rotate about axis 34. Rotor 30 is so driven regardless of mode of operation.

Transmission drive shaft 72 of one rotor must be interconnected with corresponding shaft 72 of the other rotor.

We will now consider the mechanism which causes rotor 30 to change diameter. Still viewing FIG. 3, we see that shafts 80 and 82 are positioned coaxially by appropriate support bearings (not shown) about axis 34 and each carries at one end thereof bevel gears 84 and 86, respectively, which form part of differential 88, which also includes pinion or planetary gears 90 and 92 and other similar pinion or planetary gears, each of which is connected to a jack screw 95 in each blade 44.

As engine 38 causes rotor 30 to rotate about axis 34, shafts 80 and 82 will rotate therewith. Each of shafts 80 and 82 have a clutch or brake member 100 and 102 connected thereto. Both of these brakes are pilot operated in conventional fashion, for example, through a solenoid mechanism. When brake 100 is applied, shaft 80 and bevel gear 84 are stopped and, as rotor drive shaft 43 and control hub member 41 continue to rotate, the pinions such as 90 and 92 will be caused to rotate and thereby rotate jack screws 95. Nut member 110 threadably engages jack screw 95 and is free to move along feathering axis 46 within a chamber 112 defined between jack screw 94 and the fixed inner portion 44a of blade 44. Nut 110 is connected to the outer movable portion 44b of blade 44 through tension member or tube 114 so that translation of nut 110 causes translation of blade portion 44b with respect to fixed blade portion 44a to thereby vary the diameter of rotor 30. It will therefore be seen that the applying of brake 100 establishes relative rotation between shafts 80 and 82, and that the rotation of pinion gears 90 and 92 caused thereby causes nut 110 to translate along feathering axis 46 so as to translate the outer movable portion 44b of the blade along axis 46 with respect to the inner fixed portion 44a of the blade, thereby varying the diameter of rotor 30. It will be evident that the pitch of the threads of jack screw 95 annd nut 110 determines the rate of diameter change of rotor 30 and whether the diameter will increase or decrease. It will further be evident that application of brake 102 will operate to cause the rotors to vary diameter in the opposite direction.

As stated previously, an identical rotor transmission system is provided for each of the rotors such as 28. To insure that the diameters of the rotors, such as 28 and 30, vary synchronously, synchronizer shaft 116, which is preferably concentric about pod tilt axis 118, connects gears 91 of rotors 28 and 30 through beveled gears 120 which are located at the opposite ends of synchronizer shaft 116. Synchronizer shaft 116 causes the relative rotation between shafts 80 and 82 of all rotors to be identical and hence rotor diameter variation to be identical for all rotors.

Pod end 26b may be caused to pivot or tilt about axis 118 by the coaction of arcuate gear member 130, which is attached thereto, and which coacts with gear member 132, which is in turn driven through shaft 134 by pilot-operated motor 136. Pod ends 24b and 26b may also be caused to tilt or pivot by the mechanism disclosed and described in greater particularity in U.S. Pat. No. 3,514,052 identified supra.

Still viewing FIG. 3, we see that the end of shaft 80 opposite differential 88 includes a screw thread member 92 which threadably engages nut member 94, which nut has outer diameter splines 43 which are parallel to axis 34 and which cooperatively engage inner diameter splines 96 on shaft 82. Nut member 94 could use I.D. and O.D. threads of different pitch instead of this spline connection. It will accordingly be seen that whenever relative rotation occurs between shafts 80 and 82, nut 94 will be caused to translate along axis 34. The function of this translation of nut 94 is to limit the degree of extension or retraction of the blades 44 and hence the rotor diameter so that the various rotors do not interfere with one another or with the fuselage and also to prevent motion of nut 110 from exceeding the desired levels of travel on jack screw 95. FIG. 3 shows nut 94 abutting positive stop member 142, which is preferably the rotor extension stop. When nut 94 is at the opposite end of its travel, it abuts positive stop 144, which is preferably its rotor retraction stop. Accordingly, nut 94 serves to limit the diameter of rotor 30, both with respect to minimum diameter as a retraction stop, and with respect to maximum diameter as an extension stop.

Now referring to FIGS. 4 and 5, we see mechanism which permits us to vary one or both of the rotor diameter limit stops of FIG. 3 but the extension stop only is illustrated. As described previously, the diameter of rotor 30 should be greater when in the helicopter mode than when in the propeller mode and the mechanism shown in FIGS. 4 and 5 limits rotor diameter variation. In FIG. 4, rotor 30 is shown in solid lines in the propeller mode and pod portion 26b and transmission housing 56, which carry the rotor 30 is mounted for pivotal or tilt action about tilt or pivot axis 118. Yoke member 150 is pivotally connected to fixed structure attached to wing 16 or pod 26a in any desired offset relation to tilt axis 118 such as at pivot axis 152. As best shown in FIG. 5, yoke 150 carries ring member 154 concentrically about axis 34 and central shaft 80 extends through ring 154 so that ring member 154, in actuality, serves as the extension stop 142 of rotor 30.

Yoke 150 is shown in phantom position in FIG. 4 for the helicopter mode of operation so that extension stop 142, which is in fact ring 154, is maximum distance $D_1$ from tilt axis 118, thereby permitting maximum rotor diameter in the helicopter mode of operation. In view of the offset relation between pivot axis 152 of yoke 150 and tilt axis 118, as rotor 30 pivots between the helicopter mode of operation shown in phantom in FIG. 4 and the propeller mode of operation shown in solid lines in FIG. 4, the distance between tilt axis 118 and extension stop 142 becomes minimum at distance $D_2$ so that the diameter of the rotor or propeller is minimum during the propeller mode of operation. It will therefore be seen that using the construction shown in FIGS. 4 and 5, the position of extension stop 142 can be varied in response to pod tilting, preferably so as to be maximum during helicopter mode of operation and minimum during the propeller mode of operation. To avoid interference between yoke member 150 and the pod tilt support mechanism, the yoke may be fabricated so that selectively contoured bends 160 are located therein, or pivot axis 152 may be located so that interference does not occur. In addition, ring 154 is pivotally connected to the arms 162 and 164 of yoke 150 by pivot pins 166 to avoid binding between ring 154 and shaft 80.

It will be noted that with this construction, the diameter of rotors 28 and 30 may overlap fuselage 12 in the helicopter mode without interfering with the fuselage when in transition to and when in the propeller mode.

Alternate mechanism for varying the extension stop of the rotor is shown in FIGS. 6 and 7. The FIG. 6 and 7 construction includes cam member 170, which is fixedly connected to pod stationary portion 26a by conventional attachment means through attachment holes 172 and which includes selectively contoured cam surace 174, against which limit step lug 94 bears to limit the diameter of rotor 30. It will be noted by viewing FIG. 6 that the distance $D_1$ to the cam surface 174 from tilt axis 118 is greater when rotor 30 is in its phantom helicopter made of operation than the distance $D_2$ when rotor 30 is in its solid line propeller mode of operation. Accordingly, because of the limit stops, the rotor diameter must be decreased before the rotor may tilt from the helicopter mode position to the propeller mode position. To permit freedom of motion of center shaft 80, selectively contoured aperture 180 is fabricated in cam member 170. Since, as best shown in FIG. 2, rotors 28 and 30 overlap fuselage 12, an important feature of the FIG. 6 and 7 construction is that due to physical interference between nut 94 and cam surface 174, the diameter of the rotors cannot expand beyond a safe limit unitl the rotor is tilted the necessary amount when in transition from the propeller to the helicpoter mode of operation.

Figure 8:
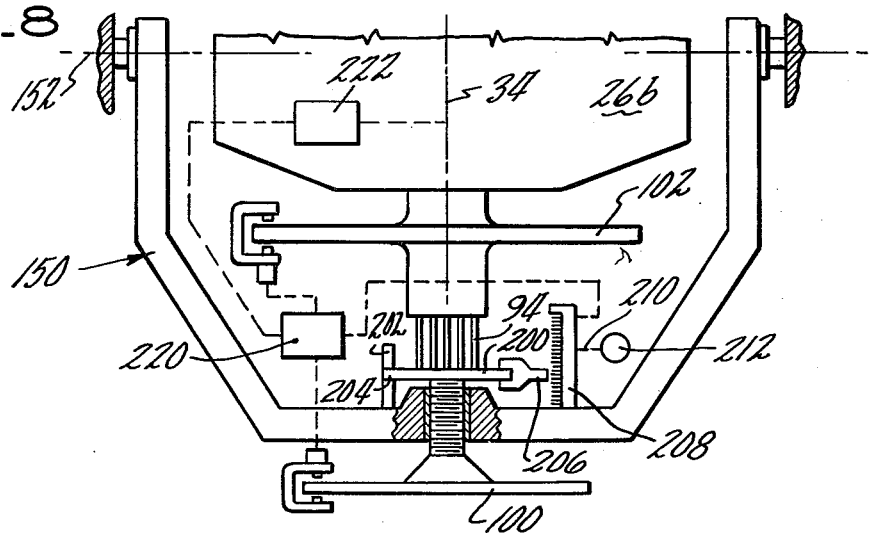
FIG. 8 illustrates an embodiment of this invention in which the rotor diameter is indicated at all times and/or in which the diameter of the rotor is varied in response to pod tilting.

Referring to FIG. 8 we see an embodiment of this invention comparable to the FIG. 4 and 5 constructions which includes provisions for indicating rotor position and/or controlling rotor diameter in response to pod tilting. With respect to the mechanism for indicating rotor diameter, it will be noted that stop nut 94 carries nut collar and bearing element 200 therewitn, which projects from stop nut 94 for translation therewith along axis 34, but which is prevented from rotation about axis 34 by projecting lug 202, which projects from yoke 150 and coacts with slot or key 204 in the periphery of nut collar and bearing 200. Sliding contact 206 is carried by and projects from collar 200 and coacts with linear potentiometer 208 to produce an electric signal proportional to the position of stop nut 94 and hence the diameter of rotor 28 or 30. This electric signal is transmitted through conventional electric circuit 210 to appropriate and conventional gauge 212, which is preferably positioned to be in view of the pilot. It will therefore be noted that utilizing the FIG. 8 construction, the pilot is made aware of the rotor diameter at all times.

Still viewing FIG. 8, we will see that the construction taught therein will cause the rotor diameter to vary in response to the degree of pod tilting. In particular, a signal corresponding to actual diameter is imparted to conventional comparator 220 from linear potentiometer 208 and is compared to the desired rotor diameter for a given degree of pod tilting, which is introduced to comparator 220 as an input signal from conventional pod angle measurer 222, and the diameter error signal generated by comparator 220 will be selectively sent to either retraction brake 102 or extension brake 100 to cause the rotor diameter to vary in response to the amount of pod tilting.

Figure 9:
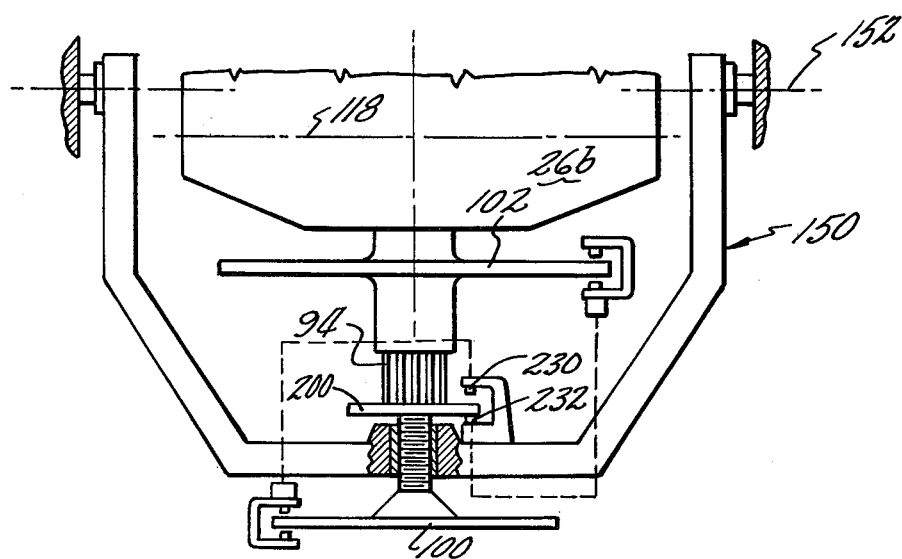
FIG. 9 shows an embodiment of this invention which shows a second mechanism for varying the diameter of the rotor in response to pod tilting.

Referring to FIG. 9 we see a modification of our construction comparable to the FIG. 4 and 5 constructions which includes a second mechanism for causing the rotor diameter to vary in response to the amount of pod tilting. In the FIG. 9 construction, upper limit switch 230 and lower limit switch 232 are suspended from yoke 150 so as to been opposite sides of nut collar and bearing 200 to be actuatable thereby in response to pod tilting to selectively actuatate retraction brake or clutch 102 and extension brake or clutch 100 to vary the rotor diameter in response to pod tilting. It will be remembered that in this construction, due to the offset relationship between axes 118 and 152, te position of yoke 150 with respect to axis 118 varies with pod angle.

Figure 10:
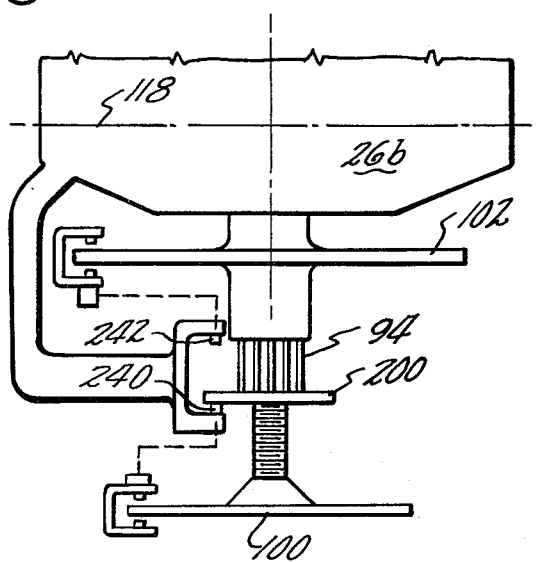
FIG. 10 shows an embodiment of this invention in which the rotor extension brake and the rotor retraction brake are released when the positive stop positions of the rotor diameter actuating mechanisms are reached.

It is a further teaching of this invention that the rotor retraction brake 102 and the rotor extension brake 100 be released when stop nut 94 reaches the appropriate end position and this is accomplished through the construction shown in FIG. 10, wherein microswitch 240, when actuated by nut collar and bearing 200 serves to release extension brake 100, while limit switch 242, when actuated by nut collar and bearing 200, serves to release retraction rotor brake 102. Accordingly, it will be seen that when rotors 28 and 30 are in their minimum or maximum diameter positions, the rotor diameter varying mechanism described above and shown in particularity in FIG. 3 becomes inactive due to the action of collar 200 with microswitches 240 or 242.

While the FIG. 10 embodiments is particularly suited to use with the mechanisms of FIGS. 5 and 7, it could also be used as a redundant feature with the FIG. 8 and FIG. 9 mechanism.

While electrical limit switches are shown in FIGS. 8 and 9, those skilled in the art will realize that other mechanism such as hydraulic servo valves could as well be used.

I wish it to be understood that I do not desire to be limited to the exact details of construction shown and described, for obvious modifications will occur to a person skilled in the art.

I claim:

1. An aircraft having:
   (a) two variable diameter rotors,
   (b) first means to vary the diameter of the first rotor,
   (c) second means to vary the diameter of the second rotor, and (d) means interconnecting said first and second means so that the diameters of both rotors are substantially the same at all times.

2. Apparatus according to claim 1 and including means to limit rotor diameter.

3. An aircraft having:
(a) a plurality of variable diameter rotors,
(b) means to vary the diameter of each of said rotors, and
(c) means interconnecting all of said rotor diameter varying means so that the diameters of all rotors are substantially of the same at all times.

4. Apparatus according to claim 3 and including means to indicate the diameter of at least one of said rotors at all times.

5. Apparatus according to claim 3 wherein said rotor diameter varying means varies the diameter of said rotors between maximum diameter and minimum diameter positions, and including means to inactivate said rotor diameter varying means when said rotors are in either of said positions.

6. An aircraft having:
(a) two rotors each including:
(1) a plurality of variable length blades extending from said rotors for rotation therewith so that said rotors are variable diameter,
(b) means to support said rotors in a first position wherein the aircraft operates in a helicopter mode and a second position wherein the aircraft operates in a propeller mode,
(c) means to tilt said rotors between said first and said second positions,
(d) first means to vary the diameter of the first rotor as said rotors tilt between said first and said second positions,
(e) second means to vary the diameter of the second rotor as said rotors tilt between said first and said second positions, and
(f) means operatively interconnecting said first and said second rotor diameter varying means so that the diameters of said rotors are substantially the same at all times.

7. Apparatus according to claim 6 and including means to limit the diameter of said rotors.

8. An aircraft having:
(a) two rotors each including:
(1) a plurality of variable length blades extending from said rotors for rotation therewith so that said rotors are variable diameter,
(b) means to support said rotors in a first position wherein the aircraft operates in a helicopter mode and a second position wherein the aircraft operates in a propeller mode,
(c) means to tilt said rotors between said first and said second positions,
(d) first means to vary the diameter of the first rotor,
(e) second means to vary the diameter of the second rotor, and
(f) means interconnecting said first and second means so that the diameters of both rotors vary so that they are substantially the same at all times.

9. Apparatus according to claim 8 wherein said means for varying the diameter of said rotors is responsive to said rotor tilt means.

10. An aircraft having:
(a) two rotors each including:
(1) a plurality of variable length blades extending from said rotors for rotation therewith so that said rotors are variable diameter,
(b) means to support said rotors in a first position wherein the aircraft operates in a helicopter mode and a second position wherein the aircraft operates in a propeller mode,
(c) means to tilt said rotors between said first and said second positions,
(d) means to synchronously vary the diameter of said rotors as said rotors tilt between said first and said second positions,
(e) means to limit the diameter of said rotors, and
(f) wherein said rotor support means includes a pod member for each rotor mounted for tilting about a tilt axis between a position wherein said rotors are in said first position and a position wherein said rotors are in said second position, and further wherein said rotor diameter limiting means is:
(1) a nut member mounted for translation along the axis of rotation of the rotor in response to rotor diameter variation,
(2) and positive stop means selectively positioned along the axis of rotation to prevent nut translation therebeyond, and including means to vary said rotor diameter limiting means in response to pod tilting including a yoke member pivotally mounted in offset relation to said tilt axis and supporting said positive stop means so that the position of said positive stop means varies in response to pod tilting.

11. An aircraft including:
(a) a plurality of variable diameter rotors mounted for rotation about this respective axes of rotation and each including:
(1) a plurality of variable length blades each having:
(A) a fixed inner portion,
(B) and a movable outer portion,
(b) means to cause said rotors to so rotate,
(c) first means to cause said first rotor to vary diameter including:
(1) a differential assembly mounted in said first rotor for rotation therewith,
(2) a plurality of jackscrew members each connecting said differential member to the movable portion of one of said blades so that operation of said differential assembly causes said blades to change length and hence vary rotor diameter,
(3) means to selectively operate said differential assembly so that the jackscrew members are driven to selectively vary rotor diameter,
(d) second means to cause said second rotor to vary diameter including:
(1) a differential assembly mounted in said first rotor for rotation therewith,
(2) a plurality of jackscrew members each connecting said differential member to the movable portion of one of said blades so that operation of said differential assembly causes said blades to change length and hence vary rotor diameter,
(3) means to selectively operate said differential assembly so that the jackscrew members are driven to selectively vary rotor diameter, and
(e) means operatively interconnecting said first and second rotor diameter varying means so that both rotors are of substantially the same diameter at all times.

12. Apparatus according to claim 11 and including means to vary the pitch of said blades.

13. Apparatus according to claim 11 and including means to limit the extension and retraction of said blades and hence the diameter of said rotor.

14. An aircraft including:
(a) a plurality of variable diameter rotors mounted for rotation about their respective axes of rotation and each including:
  (1) a plurality of variable length blades each having:
    (A) a fixed inner portion,
    (B) and a movable outer portion,
(b) means to cause said rotors to so rotate,
(c) means to cause each of said rotors to vary diameter including:
  (1) a differential assembly mounted in each of said rotors for rotation therewith,
  (2) a plurality of jackscrew members each connecting said differential member to the movable portion of one of said blades so that operation of said differential assembly causes said blades to change length and hence vary the rotor diameter,
  (3) means to selectively operate each of said differentials so that the corresponding jackscrew members are driven to selectively vary rotor diameter,
  (4) means to synchronize variation of the diameters of said rotors, and
(d) wherein said differential assembly includes spaced beveled gears operatively connected to pinion gears therebetween and wherein said jackscrew members include threaded jackshafts connected to said pinion gears for rotation therewith and further including concentric shaft members mounted for rotation with said rotor about said axis of rotation and with each of said shaft members being connected to one of said beveled gears of said differential assembly, and means to selectively stop either of said shaft members so as to cause said pinion gears and said jackscrew members to rotate in either direction during rotor rotation to vary the diameter of the rotor.

15. Apparatus according to claim 14 and including a nut member threadably connected to one of said shaft members and connected by a spline or threaded connection to the other of said shaft members so that relative rotation between such shaft members causes translation of said nut member, and positive stop means to limit translation of said nut member in both directions so as to limit the maximum and minimum diameter of said rotor.

16. Apparatus according to claim 14 and including a nut member threadably engaging each of said jack shafts and connected to the movable portion of one of said blades so that rotation of said jackshafts by said differential assembly causes the movable portion of said blade to move with respect to the fixed portion of said blade so as to vary rotor diameter.

17. Apparatus according to claim 16 and including a tube-type member enveloping said jackshaft and connected to said nut and said movable blade portion so that rotation of said jackshaft causes translation of said nut and movable blade portion.

18. Apparatus according to claim 14 wherein said means to selectively stop either of said shaft members is a brake member on each of said shaft members.

19. An aircraft having:
(a) a variable diameter rotor,
(b) means supporting said rotor for tilting about a tilt axis between a first position wherein the rotor axis is substantially vertical and the aircraft is in the helicopter mode of operation and a second position wherein the rotor axis is substantially horizontal and the aircraft is in the propeller mode of operation,
(c) means to limit the diameter of said rotor including:
  (1) a nut member translatable along the rotor axis of rotation in response to rotor diameter variation,
  (2) and a positive stop member selectively positioned along the rotor axis of rotation to intercept and stop said nut member at the limiting diameter,
(d) and means to vary the position of said positive stop member along said rotor axis of rotation in response to the tilting of the rotor including a yoke member pivotally supported in offset relation to said tilt axis and supporting said positive stop member so that the position of said positive stop member along said axis of rotation varies in response to rotor tilting.

20. An aircraft having:
(a) a variable diameter rotor mounted for tilting about a tilt axis between a first position wherein the rotor axis of rotation is substantially vertical so that the aircraft is in the helicopter mode of operation and a second position wherein the rotor axis of rotation is substantially horizontal so that the aircraft is in the propeller mode of operation,
(b) a nut member translatable along the rotor axis of rotation in response to rotor diameter variation,
(c) and means to limit the diameter of said rotor in response to rotor tilting including a selectively contoured cam member selectively positioned with respect to said nut member to limit the travel of said nut member so that the allowable translation of said nut member along the rotor axis of rotation varies with rotor tilting.

21. An aircraft having:
(a) two rotors each including:
  (1) a plurality of variable length blades extending from said rotors for rotation therewith so that said rotors are variable diameter,
(b) means to support said rotors in a first position wherein the aircraft operates in a helicopter mode and a second position wherein the aircraft operates in a propeller mode,
(c) means to tilt said rotors between said first and said second positions,
(d) means to synchronously vary the diameter of said rotors as said rotors tilt between said first and said second positions,
(e) means to limit the diameter of said rotors, and
(f) wherein said rotor support means includes a pod member for each rotor mounted for tilting about a tilt axis between a position wherein said rotors are in said first position and a position wherein said rotors are in said second position, and further wherein said rotor diameter limiting means is:
  (1) a nut member mounted for translation along the axis of rotation of the rotor in response to rotor diameter variation, and
  (2) positive stop means selectively positioned along the axis of rotation to prevent nut translation therebeyond, and including means to vary said rotor diameter limiting means in response to pod tilting including a selectively contoured cam member selectively positioned with respect to said nut member to limit the travel of said nut member so that the allowable translation of said nut member along the rotor axis of rotation varies with rotor tilting.

22. Apparatus according to claim 14 and including a nut member threadably connected to one of said shaft members and connected by a spline or threaded connection to the other of said shaft members so that relative rotation between such shaft members causes translation of said nut member, and positive stop means to limit translation of said nut member in both directions so as to limit the maximum and minimum diameter of said rotor, and including a support pad member for each rotor mounted for tilting about a tilt axis between a position wherein said rotors are in a first position and a position wherein said rotors are in a second position, and further including means to vary said rotor diameter limiting means in response to pod tilting including a yoke member pivotally mounted in offset relation to said tilt axis and supporting said positive stop means so that the position of said positive stop means varies in response to pod tilting.

23. An aircraft including:
 (a) a plurality of variable diameter rotors mounted for rotation about their respective axes of rotation and each including:
  (1) a plurality of variable length blades each having:
   (A) a fixed inner portion, and
   (B) a movable outer portion,
 (b) means to cause said rotors to so rotate,
 (c) means to cause each of said rotors to vary diameter including:
  (1) a differential assembly mounted in each of said rotors for rotation therewith,
  (2) a plurality of jackscrew members each connecting said differential member to the movable portion of one of said blades so that operation of said differential assembly causes said blades to change length and hence vary the rotor diameter,
  (3) means to selectively operate each of said differentials so the corresponding jackscrew members are driven to selectively vary rotor diameter,
  (4) means to synchronize variation of the diameters of said rotors,
 (d) wherein said differential assembly includes spaced beveled gears operatively connected to pinion gears therebetween and wherein said jackscrew members include threaded jackshafts connected to said pinion gears for rotation therewith and further including concentric shaft members mounted for rotation with said rotor about said axis of rotation and with each of said shaft members being connected to one of said beveled gears of said differential assembly, and means to selectively stop either of said shaft members so as to cause said pinion gears and said jackscrew members to rotate in either direction during rotor rotation to vary the diameter of the rotor, and
 (e) including a nut member threadably connected to one of said shaft members and connected by a spline connection to the other of said shaft members so that relative rotation between such shaft members causes translation of said nut member, and positive stop means to limit translation of said nut member in both directions so as to limit the maximum and minimum diameter of said rotor, and including a support pod member for each rotor mounted for tilting about a tilt axis between a position wherein said rotors are in a first position and a position wherein said rotors are in a second position, and including means to vary said rotor diameter limiting means in response to pod tilting including a selectively contoured cam member selectively positioned with respect to said nut member to limit the travel of said nut member so that the allowable translation of said nut member along the rotor axis of rotation varies with rotor tilting.

24. An aircraft having:
 (a) a fuselage,
 (b) two variable diameter rotors supported from said fuselage and tiltable between a first position wherein said aircraft is in the helicopter mode of operation and a second position wherein said aircraft is in the propeller mode of operation,
 (c) first means to vary the diameter of said first rotor to be of maximum diameter when in said first position and to be of minimum diameter when in said second position,
 (d) second means to vary the diameter of said second rotor to be of maximum diameter when in said first position and to be of minimum diameter when in said second position, and
 (e) means operatively interconnecting said first and said second rotor diameter varying means to cause said rotors to be substantially of the same diameter at all times.

* * * * *

UNITED STATES PATENT AND TRADEMARK OFFICE
CERTIFICATE OF CORRECTION

PATENT NO. : 4,142,697
DATED : March 6, 1979
INVENTOR(S) : Evan A. Fradenburgh

It is certified that error appears in the above-identified patent and that said Letters Patent are hereby corrected as shown below:

Column 1, line 48     "lower" should be --hover--

Column 1, line 53     "properties" should be --problems--

Column 3, line 29     "motor" should be --rotor--

Column 3, line 51     "control" should be --central--

Column 4, line 31     "43" should be --93--

Column 5, line 36     "step lug" should be --stop nut--

Column 5, line 40     "made" should be --mode--

Column 6, line 29     "been" should be --be on--

Column 6, line 35     "te" should be --the--

Column 8, line 34     "this" should be --their--

Column 11, line 16     "pad" should be --pod--

Signed and Sealed this

Twenty-ninth Day of April 1980

[SEAL]

Attest:

SIDNEY A. DIAMOND

*Attesting Officer*     *Commissioner of Patents and Trademarks*